US011902280B1

(12) United States Patent
Cheng et al.

(10) Patent No.: US 11,902,280 B1
(45) Date of Patent: Feb. 13, 2024

(54) INTERNET ACCESS CONTROL BASED ON EXTERNAL THIRD-PARTY DATA

(71) Applicant: Trend Micro Incorporated, Tokyo (JP)

(72) Inventors: Charles Hung-Ching Cheng, Sunnyvale, CA (US); Cheng-Lin Hou, San Jose, CA (US); Chinghsien Liao, Cupertino, CA (US); Hua-Lung Richard Huang, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 181 days.

(21) Appl. No.: 17/384,383

(22) Filed: Jul. 23, 2021

(51) Int. Cl.
*H04L 9/40* (2022.01)
*H04L 69/22* (2022.01)

(52) U.S. Cl.
CPC ........ *H04L 63/101* (2013.01); *H04L 63/0236* (2013.01); *H04L 69/22* (2013.01)

(58) Field of Classification Search
CPC ..................................................... H04L 63/101
See application file for complete search history.

(56) References Cited

U.S. PATENT DOCUMENTS

| 9,615,134 | B2 | 4/2017 | Maskatia et al. | |
| 9,866,642 | B2 | 1/2018 | Raleigh et al. | |
| 10,805,303 | B2 * | 10/2020 | Bhattacharya | G06F 21/6218 |
| 2010/0058446 | A1 * | 3/2010 | Thwaites | H04L 63/101 |
| | | | | 709/224 |
| 2012/0030734 | A1 * | 2/2012 | Wohlert | H04W 60/00 |
| | | | | 726/4 |
| 2013/0017806 | A1 * | 1/2013 | Sprigg | H04M 1/66 |
| | | | | 455/411 |
| 2013/0205368 | A1 * | 8/2013 | Zurko | G06F 21/6218 |
| | | | | 726/1 |
| 2015/0032890 | A1 | 1/2015 | Bott | |
| 2022/0247790 | A1 * | 8/2022 | Dhokia | H04L 63/107 |

FOREIGN PATENT DOCUMENTS

| EP | 2 795 939 B1 | 5/2018 | |
| GB | 2533101 A * | 6/2016 | ......... G06F 16/9535 |
| WO | 2013/010147 A1 | 1/2013 | |

* cited by examiner

*Primary Examiner* — Ponnoreay Pich

(74) *Attorney, Agent, or Firm* — Beyer Law Group LLP

(57) ABSTRACT

Systems and methods for Internet access control are presented. A third-party application is hosted by a third-party server on the Internet. The third-party application has third-party data of a user. An Internet access control device detects an Internet access by the user to a target server on the Internet. The Internet access control device allows or blocks the Internet access depending on whether the Internet access is permitted or prohibited based on the third-party data.

3 Claims, 7 Drawing Sheets

INTERNET ACCESS CONTROL BASED ON EXTERNAL THIRD-PARTY DATA

BACKGROUND OF THE INVENTION

1. Field of the Invention

The present invention is directed to Internet access control.

2. Description of the Background Art

Internet access control pertains to controlling a user's access to websites and other services on the Internet. Internet access control is also referred to as parental control, screen time management, or digital wellness. A typical Internet access control application involves the use of access control policies that govern a user's Internet access privileges. The access control policies may indicate whether the user can access the Internet and may also indicate the servers that the user is permitted to access, when the user can access the servers, and how long the user can spend time accessing servers on the Internet. In a typical Internet access control application, the access control policies are based on information that is manually entered by an administrator into the Internet access control application itself. That is, the administrator, who is typically a parent or guardian when the user is a child, defines the access control policies within the Internet access control application.

SUMMARY

Systems and methods for Internet access control are presented. A third-party application is hosted by a third-party server on the Internet. The third-party application has third-party data of a user. An Internet access control device detects an Internet access by the user to a target server on the Internet. The Internet access control device allows or blocks the Internet access depending on whether the Internet access is permitted or prohibited based on the third-party data.

In one embodiment, the third-party application is an online or web-based scheduling calendar application, and the Internet access control device is an Internet access control gateway. The third-party data are event data of scheduled events of the user. An access control policy is created based on the event data. The access control policy is enforced at the Internet access control gateway. The Internet access control gateway allows the Internet access in accordance with the access control policy when the event data indicate that the Internet access is permitted and blocks the Internet access in accordance with the access control policy when the event data indicate that the Internet access is prohibited. The event data may be analyzed for indications of permitted and prohibited Internet access by parsing the event data for one or more keywords. The event data may also be analyzed for indications of permitted and prohibited Internet access using a machine learning model that has been trained using training data that have been generated by correlating event data with pre-existing, manually-defined access control policies.

In another embodiment, the third-party application is an online or web-based task tracker application, and the Internet access control device is a user computer employed by the user to perform the Internet access. The third-party data are task data of tasks that are assigned to the user. The user computer, in conjunction with a web browser, blocks or allows the Internet access depending on whether the tasks assigned to the user have been completed.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
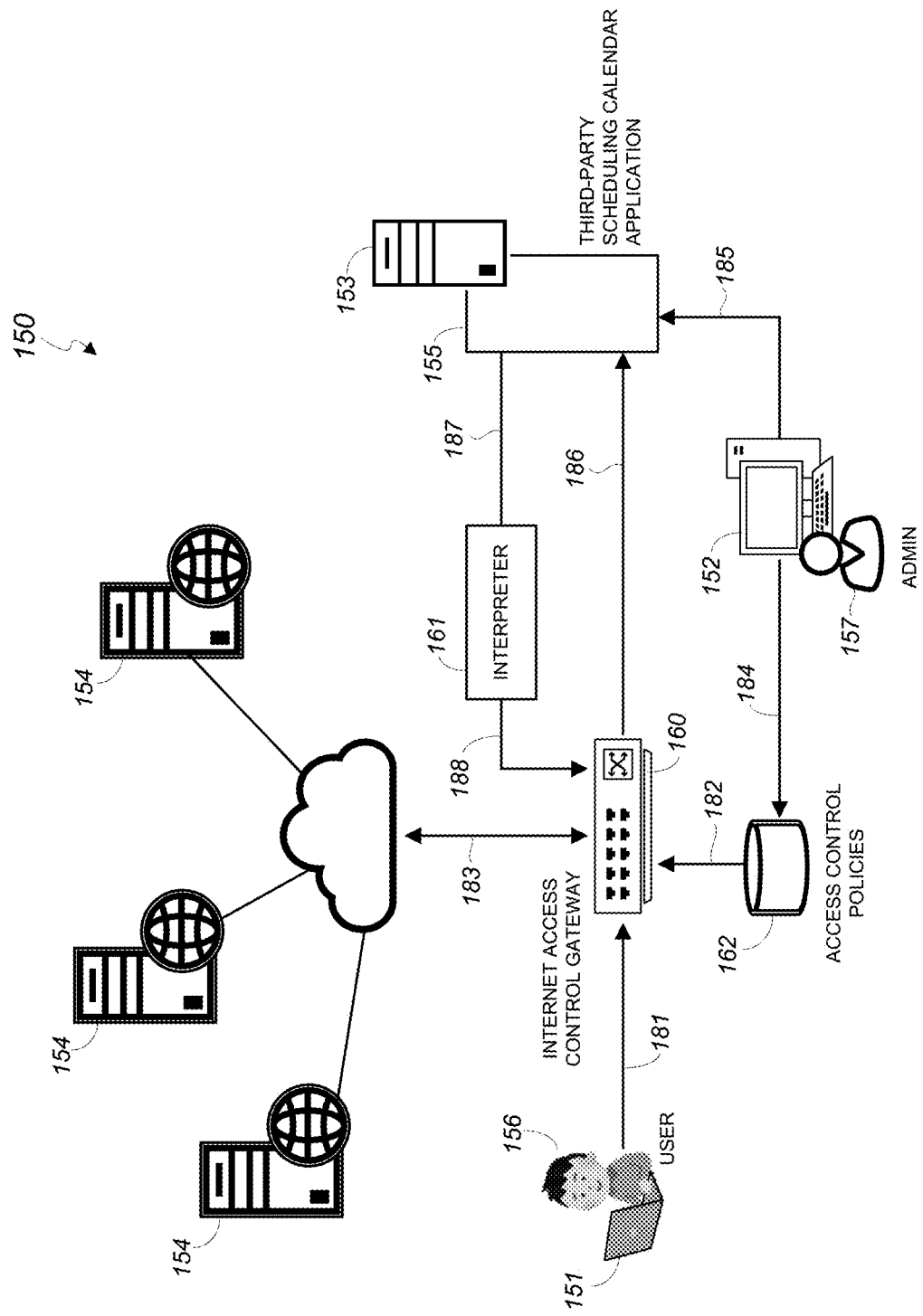
FIG. 1 shows a logical diagram of a system for controlling access to the Internet in accordance with an embodiment of the present invention.

FIG. 1 shows a logical diagram of a system 150 for controlling access to the Internet in accordance with an embodiment of the present invention. In the example of FIG. 1, the system 150 includes one or more user computers 151, an administrator computer 152, a third-party server 153, and an Internet access control device in the form of an Internet access control gateway 160.

A user computer 151 may be a laptop computer, desktop computer, smartphone, or other computing device that a user (see 156) employs to access the Internet. For example, the user computer 151 may include a web browser or other client software for communicating with one or more servers 154 that are accessible over the Internet. A server 154 may comprise a server computer with associated server software for providing webpages or other service, such as video, music, online games, social network, e-commerce, etc., to the user computer 151.

The gateway 160 may be a gateway, router, appliance, modem, or other network computing device. In the example of FIG. 1, the gateway 160 provides Internet access to computers on a local area network (LAN) that includes the user computer 151. The gateway 160 may be provided by an Internet Service Provider (ISP), for example. The gateway 160 may also be a stand-alone security appliance. The user computer 151 may communicate with the gateway 160 over a wired or wireless connection of the LAN that includes the user computer 151. The user may be identified based on characteristics of the user computer 151, such as the Internet protocol (IP) address, Media Access Control (MAC) address, computer name of the user computer 151, etc. The user may also be assigned a unique identifier (e.g., username, password, and/or email address), which the user employs to authenticate to the gateway 160 to gain access to the Internet.

The gateway 160 receives network traffic of the user computer 151 when the user attempts to access the Internet to connect to a server 154 (see arrow 181). The gateway 160 consults a plurality of access control policies 162 to determine whether to allow or block the Internet access (see arrow 182). An access control policy 162 includes rules for determining whether or not a target of the access control policy 162 (the user in this case) is allowed to access the Internet. The gateway 160 allows the user to access the Internet if an access control policy 162 indicates that the access is permitted or if there is no access control policy 162 that prohibits the access (see arrow 183). Otherwise, the gateway 160 blocks the access if an access control policy 162 indicates that the access is prohibited. For example, the gateway 160 will block the access if an access control policy 162 indicates that a website hosted by the server 154 is a prohibited website or the timestamp of the access is outside the date and time the user is allowed to access the Internet.

An administrator computer 152 may be a laptop computer, desktop computer, or other computing device that an administrator (see 157) employs to control Internet access of one or more users. In a typical home environment, the user is a child and the administrator is a parent or guardian of the child. The administrator may employ the administrator computer 152 to login to the gateway 160 and configure one or more access control policies 162 (see arrow 184) to set limits on the user's Internet access, such as how long and when the user can access the Internet, which servers 154 the user is not allowed to access, and other rules for accessing the Internet.

In a typical home environment, it is quite common for parents to relax Internet access rules when their children are out of school (e.g., during holidays) and to enforce tighter Internet access rules when their children are in school or have high priority activities to complete. Because the conditions for relaxing and tightening Internet access rules can be very dynamic, e.g., changing from day to day or even hour by hour, having the parent login to the gateway 160 to manually configure one or more access control policies 162 to update Internet access rules can get very tedious. This may result in dissatisfaction with the gateway 160 and/or the parents not even bothering to create or update the access control policies 162.

In one embodiment, the gateway 160 is configured to automatically determine Internet access rules based on third-party data provided by an external source and to generate corresponding access control policies 162 that reflect the Internet access rules. The source of the third-party data is "external" in that the source is not part of the gateway 160 and the third-party data are provided to the gateway 160 over a computer network.

In the example of FIG. 1, the external source is a third-party scheduling calendar application 155. The calendar application 155, one or more servers 153 that host the calendar application 155, and event data provided by the calendar application 155 are "third-party" in that they are not associated with the gateway 160 and have a main function that is not related to Internet access control. The calendar application 155 may be hosted by one or more server computers 153 that are accessible over the Internet. In the example of FIG. 1, the calendar application 155 is an online or web-based scheduling calendar application, such as the Google Calendar™ time management and scheduling calendar application.

The calendar application 155 is employed by the administrator for purposes other than Internet access control. Therefore, using information from the calendar application 155 to automatically determine and enforce Internet access rules allows for relatively easy and less-bothersome Internet access control compared to having the administrator manually configure (e.g., create or update) access control policies 162 in the gateway 160.

The administrator may employ the administrator computer 152 to access the calendar application 155 (see arrow 185) and enter event data of the user. In the home environment example, the parent ("administrator") may enter the schedule of the child ("user") in the calendar application 155. The parent updates the calendar application 155 on a regular basis to keep track of her family's schedules. Making the gateway 160 access the calendar application 155 to determine and enforce Internet access rules that apply to the child thus saves valuable time with no additional effort on the part of the parent.

In the example of FIG. 1, the gateway 160 includes the access control policies 162 and an interpreter 161. As can be appreciated, the access control policies 162 and the interpreter 161 may also be in separate computers that are in communication with the gateway 160.

In the example of FIG. 1, the access control policies 162 are stored in a storage device of the gateway 160. The interpreter 161 may comprise instructions that are loaded in the main memory of the gateway 160 for execution by at least one processor of the gateway 160. In one embodiment, the gateway 160 is configured to query the calendar application 155 for event data of the user (see arrow 186). The query may include parameters for retrieving event data of the user, such as a calendar account that includes the event data of the user and a date/time range. The query may be sent by the gateway 160 to the calendar application 155 over the Internet. Similarly, the calendar application 155 may provide the event data of the user over the Internet (see arrow 187).

In the embodiment where the calendar application 155 is the Google Calendar™ application, the query for event data may be made using an application programming interface (API), such as the Google Calendar™ API, Nylas Universal Calendar™ API, etc. Depending on the calendar application 155 and the API employed, an initial setup procedure may be performed by the gateway 160 and/or the administrator with the calendar application 155 for authentication and authorization purposes, e.g., using the OAuth 2.0 protocol.

Responsive to the query, the calendar application 155 provides the event data of the user to the gateway 160 (see arrow 187). The event data may include information on one or more scheduled events of the user. Each scheduled event may include a name of the event, start time and end time of the event (including dates), description of the event, and other event-related information. The interpreter 161 receives and interprets the event data to determine one or more Internet access rules that apply to the user (see arrow 188). The gateway 160 automatically generates one or more access control policies 162 for enforcing the Internet access rules. For example, the gateway 160 may automatically generate a particular access control policy for enforcing an Internet rule that targets the user, enforceable between a start time and an end time, and with an indication of whether an Internet access of the user is permitted or prohibited between the start time and end time. As can be appreciated, the identifier of the user, the start time, and the end time of the particular access control policy may be obtained from the event data of the user. The gateway 160 allows an Internet access when the particular access control policy indicates that the Internet access is permitted and blocks the Internet access when the particular access control policy indicates that the Internet access is prohibited.

The interpreter 161 may interpret event data by comparing the title and/or description of the event against predetermined keywords that are indicative of prohibited or permitted Internet access. For example, the keywords may be provided to the administrator so that the administrator may enter the keywords in corresponding data fields of the calendar application 155. Example keywords that indicate permitted Internet access may include "vacation", "no school", "holiday", "free time", names of holidays, etc. Example keywords that indicate prohibited Internet access may include "school day", "exam", "recital", "lesson", "no Internet", "school time," "no gaming," "study time," etc. Keyword searches may be performed using regular expressions, for example. Internet access will be permitted by the gateway 160 during a scheduled event that includes keywords that indicate permitted Internet access, whereas Internet access will be prohibited by the gateway 160 during a scheduled event that includes keywords that indicate prohibited Internet access.

Figure 2:
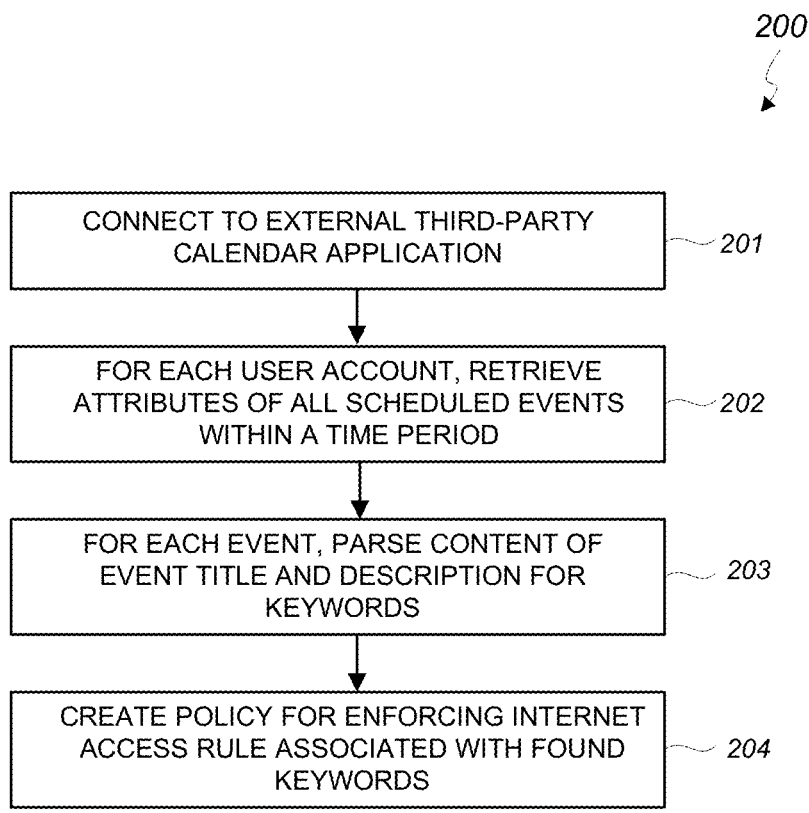
FIG. 2 shows a flow diagram of a method of controlling access to the Internet based on scheduled event data from a third-party scheduling calendar application in accordance with an embodiment of the present invention.

FIG. 2 shows a flow diagram of a method 200 of controlling access to the Internet based on scheduled event data from a third-party scheduling calendar application in accordance with an embodiment of the present invention. The method 200 may be performed by an Internet access control gateway (e.g., FIG. 1, 160) in conjunction with an external third-party scheduling calendar application (e.g., FIG. 1, 155).

The method 200 may be performed by the Internet access control gateway periodically (e.g., every H hours), in response to a command from the administrator, or upon notification of a change in a calendar account in the scheduling calendar application. The scheduled events of the user may be in a shared calendar account for multiple users (e.g., for all members of a family) or in an individual calendar account.

In the example of FIG. 2, the gateway connects to the scheduling calendar application over the Internet (step 201). The gateway may connect to the scheduling calendar application using calendar account credentials provided by the administrator along with any other credentials required by the scheduling calendar application. The gateway may connect to the scheduling calendar application to retrieve event data from one or more calendar accounts.

The gateway receives from the scheduling calendar application one or more attributes of all scheduled events for a particular calendar account within a time period (step 202). For example, the time period may be between now (i.e., current timestamp) and at least H hours from now. The attributes for each scheduled event may include, the event title, event description, event time (including start and end times), and event participants. The event participants may be one or more users.

For each scheduled event, the gateway parses the content of the event title and/or event description for keywords that are indicative of permitted or prohibited Internet access (step 203). For each scheduled event that has at least one keyword, the gateway automatically generates a particular access control policy that enforces an Internet access rule that is associated with the keyword (step 204). The particular access control policy (a) may take effect from the event start time to the event end time; (b) may be applied to the user and all other users indicated as event participants; and (c) when triggered prohibits or permits Internet access based on the keyword. That is, the particular access control policy, when triggered, blocks an Internet access by the user and other event participants when the keyword is indicative of prohibited Internet access and allows the Internet access when the keyword is indicative of permitted Internet access.

Instead of or in addition to having the administrator enter predetermined keywords in the scheduling calendar application data fields (e.g., event title, event description), a machine learning model may be employed to determine the intention of the administrator based on information in the data fields. The machine learning model may be trained to correlate and identify words, phrases, and/or languages that are indicative of permitted and prohibited access.

One approach to training the machine learning model is to leverage event data in the scheduling calendar application by comparing them against pre-existing access control policies that the administrator manually defined. The training could be carried out as part of a learning phase during which different time periods (e.g., throughout a day, several days, weeks, or months) are examined to identify which indicators in the event data correspond to which policy enforcement actions. More particularly, the training identifies event data that indicate permitted or prohibited Internet access by correlating the event data with pre-existing access control policies manually defined by the administrator. For example, assuming the following pre-existing access control policies:
 (1) Policy #1: Monday to Friday, 2:00 PM to 6:00 PM: Block Joe (joe@abc.com) from accessing Internet;
 (2) Policy #2: Saturday to Sunday, 6:00 PM to 9:00 PM: Allow Joe (joe@abc.com) to access gaming websites;
and the scheduling calendar application contains the following events for the corresponding calendar account:
 (1) Monday, 12:00 PM to 1:00 PM: Pick up laundry from the dry cleaner;
 (2) Monday, 1:00 PM to 2:00 PM: Pick up Judy from school;
 (3) Monday, 2:00 PM to 6:00 PM: Homework time for Joe;
 (4) Tuesday, 2:00 PM to 6:00 PM: Homework time for Joe;
 (5) Tuesday, 3:00 PM to 4:30 PM: Judy's soccer match;
 (6) Wednesday, 2:00 PM to 6:00 PM: Homework time for Joe;
 (7) Thursday, 2:00 PM to 6:00 PM: Homework time for Joe;
 (8) Thursday, 5:30 PM to 6:30 PM: Judy's piano lesson;
 (9) Friday, 2:00 PM to 6:00 PM: Homework time for Joe;
 (10) Saturday, 12:00 PM to 2:00 PM: Lunch with mother;
 (11) Saturday, 6:00 PM to 9:00 PM: Free time;
 (12) Sunday: 6:00 PM to 9 PM: Free time;
 (13) Sunday: Return books to library.
One way of generating training data for the machine learning model is to sub-divide each day into 15, 30, or 60-minute time windows and to examine each window to generate training data. In the above example, for Monday, all 60-minute windows between 12:00 PM and 6:00 PM could be examined as follows:

(1) 12:00 PM to 1:00 PM, "Pick up laundry from the dry cleaner": marked as negative sample since no policy is in effect during this window;
(2) 1:00 PM to 2:00 PM, "Pick up Judy from school": marked as negative sample since no policy is in effect during this window;
(3) 2:00 PM to 3:00 PM, "Homework time": marked as positive sample since Policy #1 is in effect during this window. Similarly, 3:00 PM to 4:00 PM, 4:00 PM to 5:00 PM, and 5:00 PM to 6:00 PM windows are marked as positive samples since Policy #1 is in effect during these windows.

Repeating the above process, one can generate a set of positive samples and a set of negative samples for training the machine learning model. The positive samples are indicative of prohibited Internet access and the negative samples are indicative of permitted Internet access. Training of the machine learning model may involve extracting and applying suitable pre-processing (e.g., tokenization, stop word removal, etc.) to critical data fields from the samples before creating the machine learning model using conventional machine learning algorithms, such as linear regression, SVM, etc. During an application phase, the interpreter 161 may input received event data to the machine learning model, which analyzes the event data to recognize when an access control policy to block or permit the user from accessing the Internet should be generated and enforced against the user.

Generation of training data for training the machine learning model may also leverage Natural Language Processing (NLP) technology to interpret the content of the training data to generate more accurate and specific access control policies. For example, an event description such as "Homework time for Joe" could be parsed to generate an access control policy that is only applied to "Joe" and no one else. The event data may also include additional information that can be interpreted to more accurately define the access control policy, e.g., by parsing calendar event participants to include additional targets of the access control policy other than "Joe".

In general, the machine learning model may be trained to classify event data using labeled samples of event data. More specifically, samples of event data indicative of permitted Internet access and samples of event data indicative of prohibited Internet access may be collected and used to train the machine learning model using a conventional machine learning algorithm. The interpreter 161 may receive event data of a user from the calendar application 155 and input the event data to the machine learning model to classify the event data as indicative of either permitted or prohibited Internet access.

The machine learning model may also be trained using different categories of samples of event data indicative of "school time" category, samples of event data indicative of "free time" category, etc. The interpreter 161 may receive event data from the scheduling calendar 155 and input the event data to the machine learning model to classify the event data as one of the categories. Each category may indicate permitted or prohibited Internet access. For example, event data that belong to the "school time" category may indicate prohibited Internet access, whereas event data that belong to the "free time" category may indicate permitted Internet access.

A particular access control policy that is derived from event data from the calendar application 155 may override most but not all other access control policies 162. For example, the particular access control policy may not override other access control policies 162 that prohibit access to blacklisted servers 154 (e.g., malicious servers). Otherwise, unless another access control policy 162 indicates that it cannot be overridden, the particular access control policy may override the other access control policy 162. For example, if the particular access control policy indicates that the user is prohibited from accessing the YouTube™ site on weekdays and the YouTube™ site is not on a blacklist, the gateway 160 may allow access to the YouTube™ site even on a weekday when the particular access control policy indicates, based on event data from the calendar application 155, that the weekday access to the YouTube™ site is a permitted Internet access (e.g., during a holiday).

As can be appreciated, there may be situations where the scheduling calendar 155 has no relevant event data of the user that may be used to determine an Internet access rule. In that case, the gateway 160 may simply enforce pre-existing access control policies 162.

Figure 3:
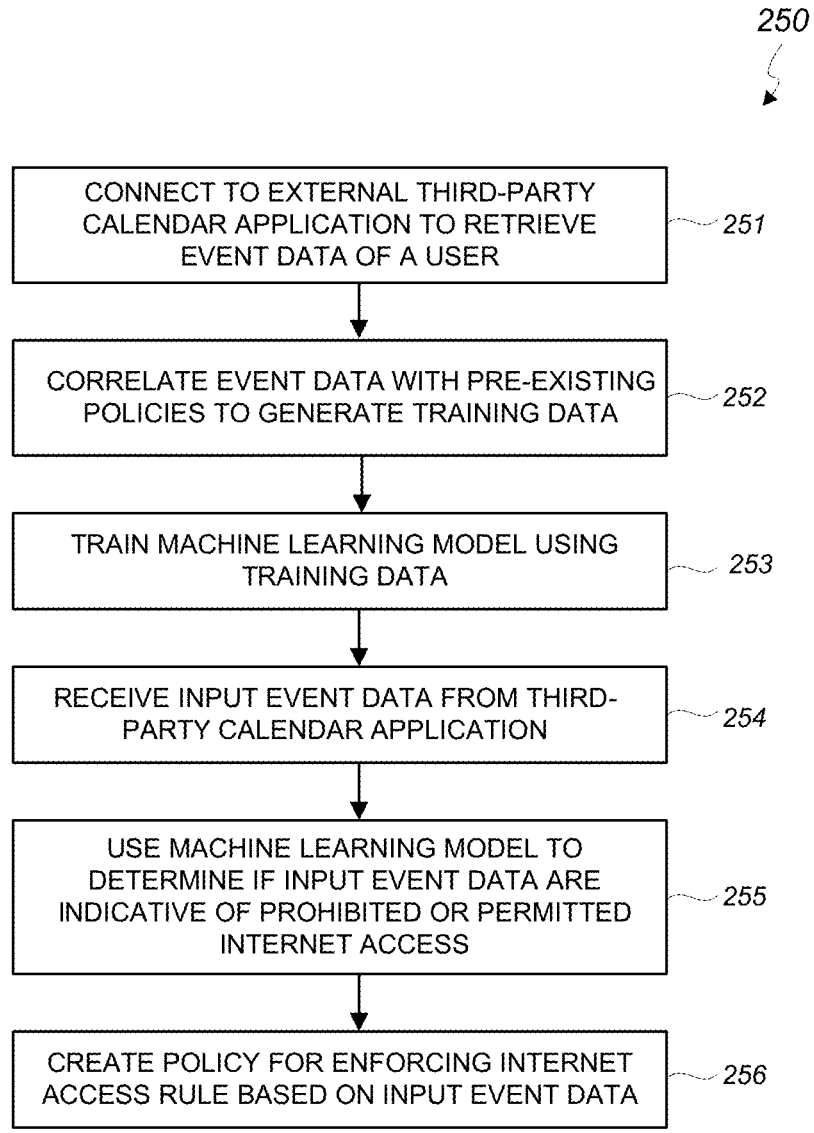
FIG. 3 shows a flow diagram of a method of controlling access to the Internet based on scheduled event data from a third-party scheduling calendar application in accordance with another embodiment of the present invention.

FIG. 3 shows a flow diagram of a method 250 of controlling access to the Internet based on scheduled event data from a third-party scheduling calendar application in accordance with another embodiment of the present invention. The method 250 may be performed by an Internet access control gateway (e.g., FIG. 1, 160) in conjunction with an external third-party scheduling calendar application (e.g., FIG. 1, 155).

The method 250 may be performed by the Internet access control gateway periodically (e.g., every H hours), in response to a command from the administrator, or upon notification of a change in event data of a calendar account in the scheduling calendar application. The scheduled events of the user may be in a shared calendar account for multiple users (e.g., for all members of a family) or in an individual calendar account.

In the example of FIG. 3, the gateway connects to the scheduling calendar application over the Internet to receive event data of a user (step 251). The gateway may connect to the scheduling calendar application using calendar account credentials provided by the administrator along with any other credentials required by the scheduling calendar application. The gateway may connect to the scheduling calendar application to retrieve event data from one or more calendar accounts.

The gateway receives and correlates the event data with pre-existing access control policies to generate training data (step 252), which are used to train a machine learning model during a learning phase (step 253). The correlation and/or training procedures may be performed in the gateway or some other computer. The machine learning model may be deployed in the gateway after the training. During an application phase, the gateway may receive input event data from the third-party calendar application (step 254) and use the trained machine learning model to determine if the input event data are indicative of prohibited or permitted Internet access (step 255). The gateway automatically generates an access control policy for enforcing an Internet access rule that is based on the input event data (step 256). For example, the gateway may generate an access control policy that applies to the user, wherein the access control policy indicates whether an Internet access of the user is prohibited or permitted depending on the determination made by the machine learning model on the input event data.

Figure 4:
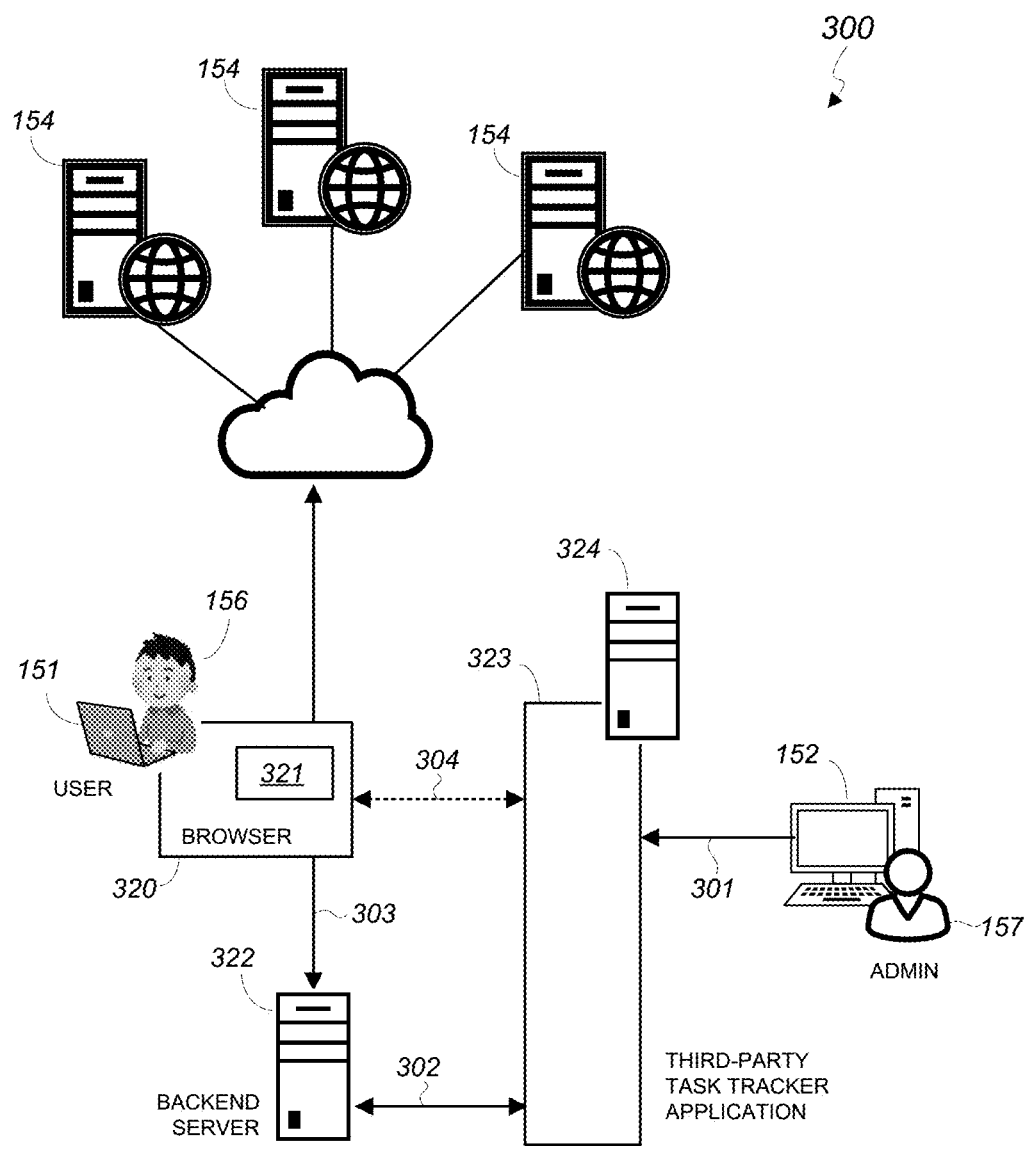
FIG. 4 shows a logical diagram of a system for controlling access to the Internet in accordance with another embodiment of the present invention.

FIG. 4 shows a logical diagram of a system 300 for controlling access to the Internet in accordance with another embodiment of the present invention.

Similar to the system 150 (see FIG. 1), the system 300 includes the administrator computer 152 employed by the administrator and the user computer 151 employed by the user to access the Internet to connect to one or more servers 154. In contrast to the system 150 where Internet access control is performed by an external Internet access control device, the system 300 performs Internet access control at the endpoint device, which in the example of FIG. 4 is the user computer 151.

In the example of FIG. 4, a third-party task tracker application 323 is an external source of third-party task data for the user computer 151. The task data may be used to determine Internet access rules that are enforced at the user computer 151. The task tracker application 323, one or more servers 324 that host the task tracker application 323, and task data provided by the task tracker application 323 are "third-party" in that they are external to the user computer 151 and have a main function that is not related to Internet access control.

In the example of FIG. 4, the task tracker application 323 is a to-do task tracker, such as the Todoist™ application, Microsoft To Do™ application, or some other online or web-based task tracker. The administrator (FIG. 4, 157) may use the administrator computer 152 to logon to the task tracker application 323 (see arrow 301) and assign one or more tasks to the user (FIG. 4, 156). As can be appreciated, the administrator already employs the task tracker application 323 for managing and assigning tasks. Therefore, using task data from the task tracker application 323 to determine whether an Internet access is permitted or prohibited advantageously allows for Internet access control with little or no additional effort from the administrator.

In a typical home environment, a parent ("administrator") may not want her child ("user") to access his favorite gaming websites until the child has completed his assigned chores ("tasks"). The parent and the child keep track of all chores as tasks to complete in the task tracker application 323. Both the parent and the child have access to the task tracker application 323, with the parent having administrator rights to assign tasks and the child having user rights to view those tasks and mark them as completed tasks. The parent usually assigns new tasks with due dates to the child. Some of the tasks are one-offs while many other tasks may be recurring, e.g., weekly tasks.

In the system 300, Internet access rules are enforced through the use of a web browser 320 that is deployed on the user computer 151. The determination and enforcement of Internet access rules as described herein may be implemented by a customized secure web browser 320 or by a browser extension 321 that is plugged into a commercially-available web browser 320.

A backend server 322 may comprise a server computer with associated server software for retrieving task data of a user from the task tracker application 323 and for determining whether an Internet access of the user is permitted or prohibited based on the task data. The backend server 322 may connect to the task tracker application 323 (see arrow 302) using account credentials provided by the administrator along with any other credentials required by the task tracker application 323. The backend server 322 may communicate with the task tracker application 323 (e.g., using open API's) to retrieve task data of the user, which include tasks assigned to the user and status (e.g., whether completed or not) of the tasks. The task data may further include a listing of servers 154 that the user is permitted to access if particular tasks assigned to the user have been completed.

In the example of FIG. 4, the web browser 320 communicates with the backend server 322 over the Internet. When the user attempts to perform an Internet access to connect to a particular server 154, the web browser 320 consults with the backend server 323 (see arrow 303) to inquire whether the Internet access is permitted or prohibited. The backend server 322 retrieves from the task tracker application 323 all or particular tasks that are assigned to the user and are due at the time of inquiry. The backend server 322 may deem the Internet access to the particular server 154 to be permitted when all or particular tasks assigned to the user have been completed. Otherwise, the backend server 322 deems the Internet access to be prohibited. The backend server 322 so informs the web browser 320, which blocks the Internet access if the access is prohibited and allows the Internet access if the Internet access is permitted.

As can be appreciated, the backend server 322 may be omitted in cases where the task tracker application 323 provides APIs or interfaces that can be invoked directly from the web browser 320 (see arrow 304). In that case, the web browser 320 performs the functionality of the backend sever 322 of retrieving task data of the user and determining whether an Internet access is permitted or prohibited based on the task data.

Figure 5:
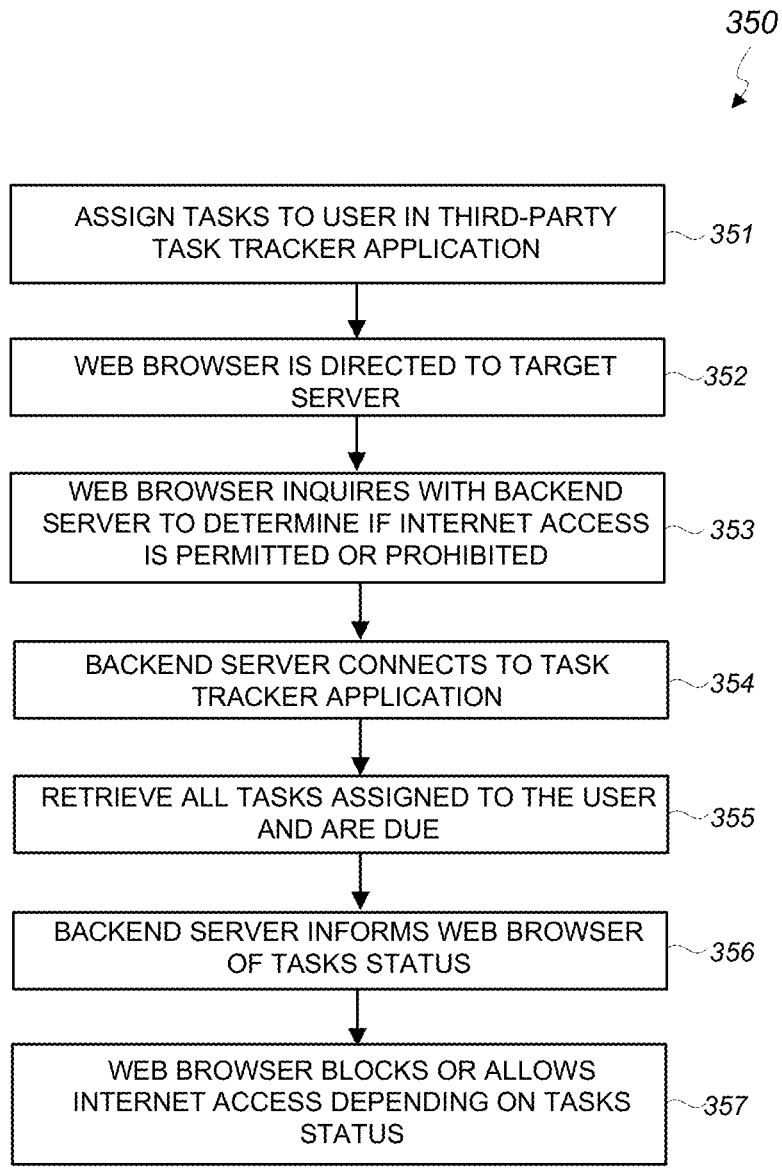
FIG. 5 shows a flow diagram of a method of controlling access to the Internet based on task data from a third-party task tracker application in accordance with an embodiment of the present invention.

FIG. 5 shows a flow diagram of a method 350 of controlling access to the Internet based on task data from a third-party task tracker application in accordance with an embodiment of the present invention. The method 350 may be performed by a user computer with a web browser that works in conjunction with an external third-party task tracker application.

In the method 350, a parent (e.g., FIG. 4, 157) is the administrator and her child is the user (e.g., FIG. 4, 156). The parent uses her computer (e.g., FIG. 4, 152) to connect to a third-party task tracker application (e.g., FIG. 4, 323) over the Internet. The parent assigns tasks to the child in the task tracker application (step 351). A web browser (e.g., FIG. 4, 320) running on the child's computer (e.g., FIG. 4, 151) is directed by the child to navigate to a target server (step 352). The web browser inquires with a backend server to determine whether the Internet access to connect to the target server is permitted or prohibited Internet access (step 353). The backend server connects to the task tracker application (step 354) and retrieves task data of the child, which include all tasks that have been assigned to the child and are currently due (step 355). The backend server informs the web browser the status of all tasks that have been assigned to the child and are currently due (step 356) and, optionally, including conditions entered by the parent in the task tracker application, such as particular servers that the child can access upon completion of the tasks. The web browser blocks or allows the Internet access depending on the status of the tasks assigned to the child (step 357). For example, the web browser may block the Internet access to the target server when the backend server informs the web browser that the child has overdue tasks, i.e., tasks that are due but has not been completed. The web browser may allow the Internet access to the target server when the backend server informs the web browser that the child has no overdue tasks.

In the method 350, the use of the backend server may not be necessary in scenarios where the web browser can directly communicate and retrieve task data from the task tracker application. In that case, the steps performed by the backend server to retrieve and analyze task data from the task tracker application may be performed by the web browser.

Figure 6:
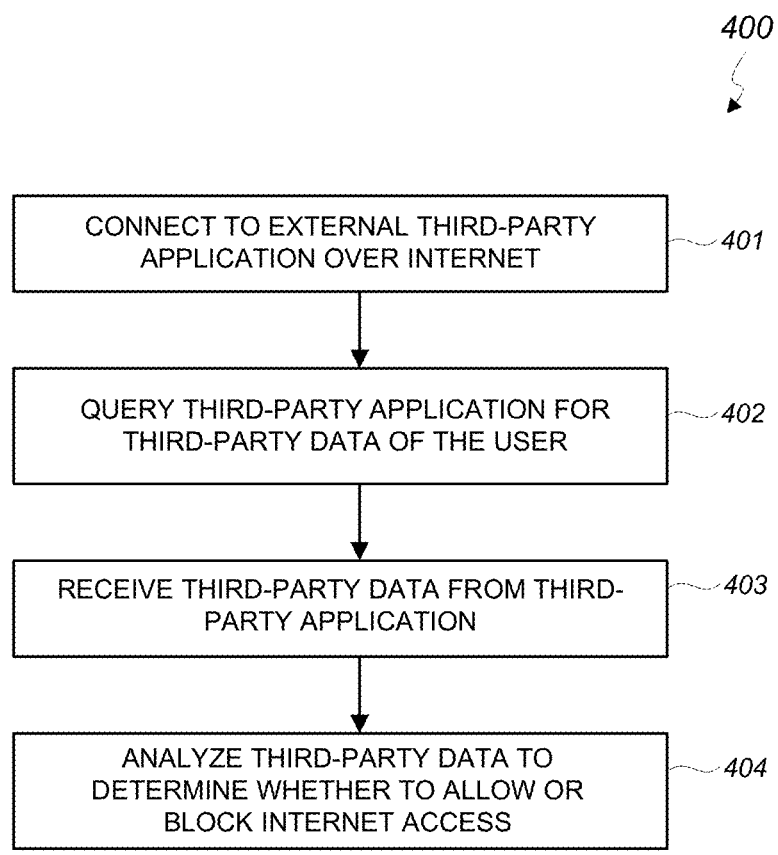
FIG. 6 shows a flow diagram of a method of controlling access to the Internet based on external third-party data from a third-party application in accordance with an embodiment of the present invention.

FIG. 6 shows a flow diagram of a method of controlling access to the Internet based on external third-party data from a third-party application in accordance with an embodiment of the present invention.

In the method 400, an Internet access control device connects to an external third-party application over the Internet (step 401). The third-party application may be a scheduling calendar application, a task tracker application, or other online or web-based application that has third-party data of a user. The Internet access control device may be a user computer that runs a web browser employed by the user, an Internet access control gateway, or some other computing device.

The Internet access control device queries the third-party application for third-party data of the user (step 402). The third-party data may be event data of scheduled events of the user, task data of tasks assigned to the user, or other data that are relevant to an Internet access by the user. The Internet access control device receives the third-party data from the third-party application (step 403) and analyzes the third-party data to determine whether to allow or block an Internet access being made by the user to connect to a target server (step 404). Depending on the third-party application and the particulars of the Internet access control device, the Internet access control device may analyze the third-party data by searching for keywords, using a machine learning model, or consulting a backend server, for example. The Internet access control device allows the Internet access when the third-party data are indicative of permitted Internet access and blocks the Internet access when the third-party data are indicative of prohibited Internet access.

Figure 7:
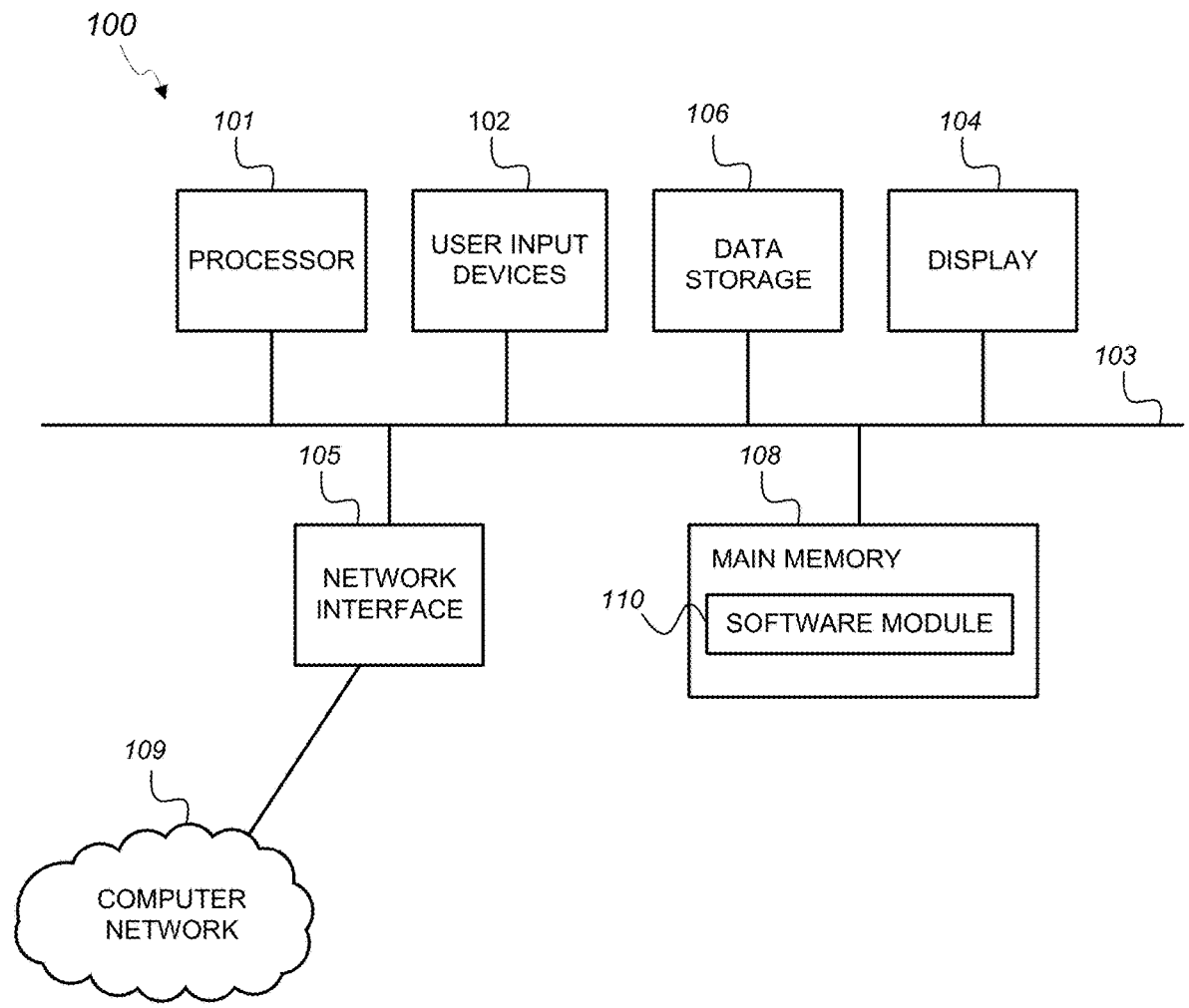
FIG. 7 shows a logical diagram of a computer system that may be employed with embodiments of the present invention.

Referring now to FIG. 7, there is shown a logical diagram of a computer system 100 that may be employed with embodiments of the present invention. The computer system 100 may be employed as an Internet access control device (e.g., FIG. 1, 160; FIG. 4, 151) or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling access to the Internet, the method comprising:
    retrieving, over the Internet, event data of scheduled events of a user from a third-party scheduling calendar application;
    sub-dividing each day of other event data in the third-party scheduling calendar application into a plurality of time windows;
    generating training data by, for each time window in the plurality of time windows, marking an event within the time window as a positive sample indicative of prohibited Internet access when an access control policy of a plurality of pre-existing control policies is in effect during the time window and marking the event within the time window as a negative sample indicative of permitted Internet access when none of the plurality of pre-existing control policies is in effect during the time window;
    training a machine learning model using the training data;
    using the machine learning model to determine if the event data are indicative of permitted or prohibited Internet access;
    creating an access control policy based on determination made by the machine learning model on the event data;
    enforcing the access control policy in an Internet access control device;
    detecting, by the Internet access control device, an Internet access of the user to connect to a target server;
    blocking, by the Internet access control device, the Internet access when the access control policy indicates that the Internet access is a prohibited Internet access; and
    allowing, by the Internet access control device, the Internet access when the access control policy indicates that the Internet access is a permitted Internet access.

2. The method of claim 1, wherein the Internet access control device is an Internet access control gateway deployed in a home environment, and the Internet access of the user is being made using a user computer on a local area network (LAN) that is connected to the Internet access control gateway.

3. The method of claim 1, wherein the access control policy is enforced between a start time and an end time of a scheduled event of the user.

* * * * *